Feb. 28, 1928.
T. B. BOURKE ET AL
1,661,028
GEARLESS DIFFERENTIAL
Filed July 26, 1926
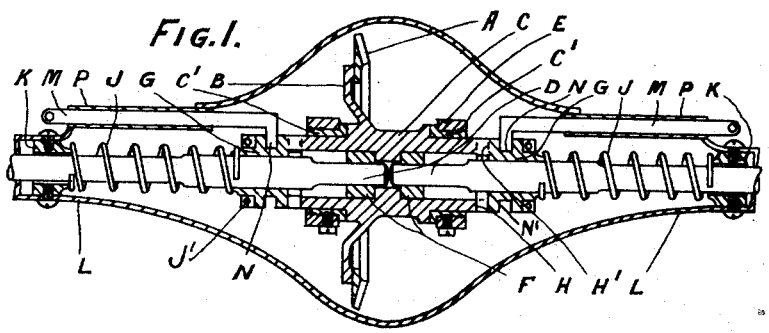
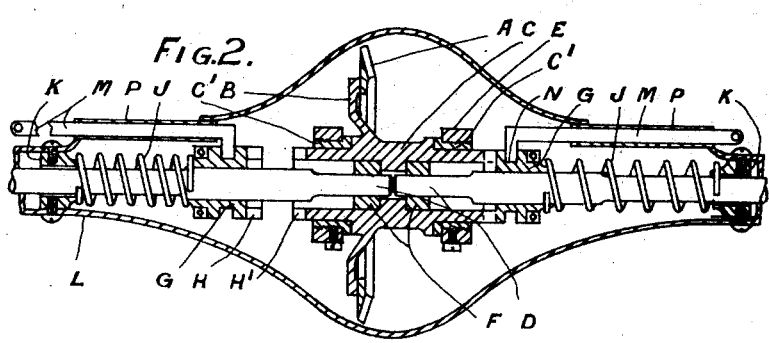
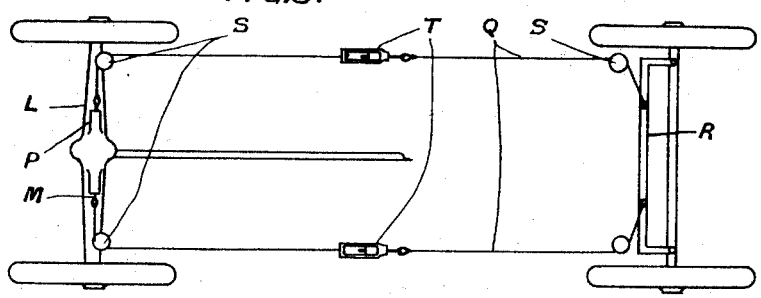
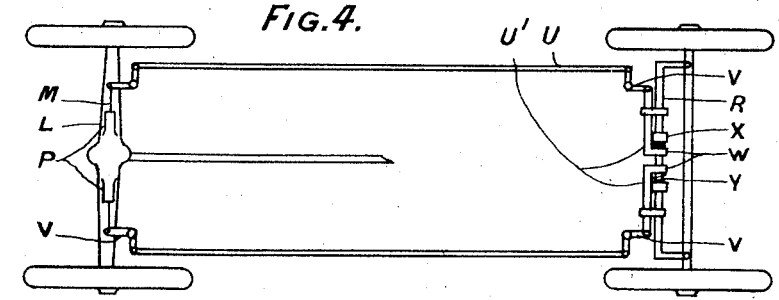
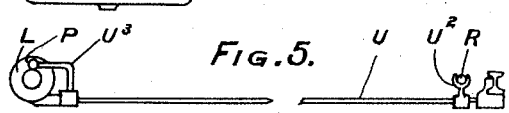
T. B. Bourke and
G. P. Setter
inventor
By: Marks & Clerk
Attys Patented Feb. 28, 1928.

1,661,028

UNITED STATES PATENT OFFICE.

THOMAS BERNARD BOURKE, OF ROCKHAMPTON, AND GEORGE PERCIVAL SETTER, OF NORTHGATE, NEAR BRISBANE, QUEENSLAND, AUSTRALIA.

GEARLESS DIFFERENTIAL.

Application filed July 26, 1926, Serial No. 125,083, and in Australia July 27, 1925.

In order to permit motor vehicles, especially those having a fairly wide wheel track, to readily turn a corner, it has been found necessary to provide means, known as differential gear, whereby the outer wheel is permitted to cover more ground than the inside one, and, at the same time, to revolve at a greater rate. This is a very important feature, but it is questionable whether better results could not be attained by freeing the inner wheel and permitting the driving power to be exerted only on the outer wheel. Ordinary differential gear has objectionable features well known to motorists; for instance, it is quite possible for either wheel at times other than when cornering to run free when both should be driven. It is the cause of skidding when either wheel runs over soft or wet surfaces or when one wheel bounces. It is also the cause of unnecessary and uneven wear and tear on the tyre and is possibly expensive in the use of fuel.

The object of this invention is the provision of a simple device and means of control which will remove these and many other objectionable features, which need not be repeated here, while retaining the quality of permitting the vehicle to turn a corner perhaps with more convenience and comfort to the occupants. Furthermore, the arrangement is such that a uniform drive is imparted to both wheels, at all times, except when the vehicle is turning a corner, as at such other times the rear or driving axle is, to all intents and purposes, a solid or continuous axle.

In carrying out the invention we dispense with the differential gear as at present in use, and use, in addition to the usual bevel driving pinion on the propeller shaft and differential bevel driven gear wheel (or crown wheel, as it is sometimes called), a pair of suitable clutches, whereby motion may be communicated from such bevel gear or crown wheel to both or either halves of the rear axle, as the case may be. These clutches are controlled by the action of the steering wheel, and we prefer that they be connected to or operated by the steering knuckle tie or radius rod by suitable means.

In order that the invention may be better understood we will now describe same with the aid of the accompanying drawings, in which Fig. 1 is a sectional elevation.

Fig. 2 is a sectional elevation showing certain parts in a disengaged position.

Fig. 3 is a diagrammatic view showing the application of the invention.

Fig. 4 is a diagrammatic view of an alternative arrangement.

Fig. 5 is a detail of another alternative arrangement.

The bevel driven gear or crown wheel A, which is of ordinary construction, being driven by the bevel driving pinion (not shown), is mounted on the flange B of the sleeve C. This sleeve C is of suitable formation and is rotatably carried in bushings $C^1$ carried in the bearings E. Bushings F, provided inside the sleeve C, carry the adjacent ends of half axles D. Although bushings $C^1$ and F are shown in the drawings and referred to in this specification, it is to be understood that ball, roller, or other suitable bearings may be used. The outer ends of the half axles D are carried by the usual bearings in the housings.

One portion of a clutch is formed on or carried by the respective ends of the sleeve C, and the other portions or slides G are slidably carried by the half axles D, which are formed so that, while longitudinal movement of the slides G is allowed, they are prevented from revolving on such half axles D. For this purpose, the half axles D may be squared (as shown) or otherwise suitably shaped, or they may be provided with a feather, multiple feathers, or flutings, the slidable portions G being formed in the bore to suit. Although we do not desire to limit ourselves to any particular design of clutch, we believe that that shown in the drawings will be the most efficacious. As shown, the sleeve C and slides G of the clutch are formed respectively on their opposing faces with dogs H $H^1$, which, in their normal position, engage with each other, as shown in Fig. 1, and in the right hand half of Fig. 2. The number, pitch, and formation of these dogs H $H^1$ would be such as to give the best results when in engagement, when de-clutching (which should take place with little or no effort on the part of the driver), and when clutching. These dogs H $H^1$ are preferably slightly tapered and may also be rounded at the ends so as to provide a ready get-away and entrance. As an alternative arrangement, we may use multiple plate friction clutches for communicating motion from the sleeve C to the half axle D.

The slides G of the clutches are normally pushed into engagement with the sleeve C by means of the springs J, which are backed by the ring or stop K secured in the housing L, ball bearings J¹ being interposed between the springs J and slide G. They are moved, as desired, by the rods M formed with a yoke N at the end and squared or otherwise suitably shaped so that they are prevented from turning round in the guides P formed integrally with or secured in the housing L. The forks N engage slots N¹ in the slides G.

This portion of the invention can be applied to all types or makes of vehicles with little or no material alteration of the housing L and certain other parts.

The slide rods M are connected, as shown in Fig. 3, by ropes, cables, or chains Q, to the steering knuckle tie or radius rod R or to any other part of the steering mechanism, so that, on same being actuated, reciprocatory motion is imparted to either. These ropes, cables, or chains Q pass over lead pulleys S suitably carried on the chassis, the ends being clamped to the steering knuckle tie or radius rod R. Tension screws T are provided for adjusting the length of the ropes, cables, or chains Q. Generally speaking, the parts are arranged so that a movement of approximately fifteen degrees is imparted to the front or steering wheels before the clutches are de-clutched.

As an alternative arrangement, as shown in Fig. 4, rods U U¹ and bell cranks V may be used in lieu of ropes, cables, or chains Q. The bell cranks V are pivotally carried in convenient positions on the chassis, and the ends of the rods U¹ are each formed with a yoke W, which straddles the steering knuckle tie or radius rod R, and which are operated by the collars X on the latter, on which cushioning springs Y are also provided.

In the arrangement shown in Fig. 5, the rods U are pivotally carried in bearings at each end, and have arms U² U³. The forks of arm U² straddle the radius rod R and are engaged and operated by the collars X on the latter. The arm U³ is articulated to the slide rod M.

It is to be understood that we do not wish to bind ourselves to constructional details, which do not affect the essential features of our invention, as these may and must be altered to suit the type or make of vehicle on which the invention is fitted.

The operation of our invention is as follows:—The respective parts are normally (that is, when the vehicle is running straight ahead or backward) as shown in Figs. 1, 3, and 4. When it is desired to turn the vehicle round a corner, say to the left hand, the steering wheel is manipulated in the usual manner, and, as the steering knuckle tie or radius rod R moves to the right hand, motion is imparted through the ropes, cables, or chains Q, or the rods U U¹ and bell cranks V, or as the case may be, to the slide rod M in the left hand side of the housing. The left hand slide portion G of the clutch is moved to the left, compressing the spring, disengaging the former from that portion of the clutch formed on the ends of the sleeve C. The road wheel on that side of the vehicle is thereby permitted to run free, while the whole of the power of the engine is exerted on the right hand road wheel through the gearing on the right hand half axle. The action when the steering wheel is oppositely turned will be readily understood. When the steering wheel is turned to steer the vehicle straight forward or backward, the two half axles are immediately clutched.

Having now particularly described and ascertained the nature of our said invention and in what manner the same is to be performed, we declare that what we claim is:—

In a gearless differential, a housing having an enlarged medial portion and restricted end portions, spaced bearings arranged in the medial portion of the housing, a sleeve journalled within said bearings, a bevelled driven gear carried with the outer surface of the medial portion of the sleeve, an annular shoulder within the bore of the sleeve and positioned medially thereof, bearings arranged within the sleeve on opposite sides of the shoulder, other bearings arranged in the restricted portions of the housing and in alignment with the bearings in the sleeve, half axles journalled respectively in said aligning bearings, the projecting ends of the sleeve being provided with clutch faces, clutching sleeves slidably and non-rotatably mounted on the half axles, springs arranged between the clutching sleeves and bearings in the restricted portions of the housing for normally holding the clutching sleeves in engagement with the clutch faces, rods slidably mounted in the casing and operably connected with the adjacent clutching sleeves, and means for operating the rods, substantially as and for the purposes set forth.

In testimony whereof we have signed our names to this specification.

THOMAS BERNARD BOURKE.
GEORGE PERCIVAL SETTER.